(12) United States Patent
Hall, Jr.

(10) Patent No.: US 10,076,108 B2
(45) Date of Patent: Sep. 18, 2018

(54) INSECT TRAP APPARATUSES AND METHODS OF USING THE SAME

(71) Applicant: Ron Hall, Jr., Prospect Heights, IL (US)

(72) Inventor: Ron Hall, Jr., Prospect Heights, IL (US)

(*) Notice: Subject to any disclaimer, the term of this patent is extended or adjusted under 35 U.S.C. 154(b) by 183 days.

(21) Appl. No.: 13/975,449

(22) Filed: Aug. 26, 2013

(65) Prior Publication Data

US 2014/0053452 A1 Feb. 27, 2014

Related U.S. Application Data

(60) Provisional application No. 61/693,033, filed on Aug. 24, 2012.

(51) Int. Cl.
*A01M 1/10* (2006.01)

(52) U.S. Cl.
CPC .................... *A01M 1/106* (2013.01)

(58) Field of Classification Search
CPC ........... A01M 1/00; A01M 1/10; A01M 1/106
USPC ................. 43/107, 122, 124, 132.1
See application file for complete search history.

(56) References Cited

U.S. PATENT DOCUMENTS

| 722,143 | A | * | 3/1903 | Raymond | 43/113 |
| 882,306 | A | * | 3/1908 | Fredrickson | 43/122 |
| 1,102,642 | A | * | 7/1914 | Brown | 43/118 |
| 1,178,076 | A | * | 4/1916 | Jefferis | 43/118 |
| 1,247,724 | A | * | 11/1917 | Sassenhoff | 43/107 |
| 1,387,716 | A | * | 8/1921 | Hofley | A01M 1/02 43/122 |
| 1,606,568 | A | * | 11/1926 | Gross | A01M 1/14 43/107 |
| 2,478,104 | A | * | 8/1949 | Johnson | A01M 1/02 43/122 |
| 3,581,429 | A | * | 6/1971 | Hickman | A01M 1/02 43/107 |
| 4,738,049 | A | * | 4/1988 | Baley | A01M 1/02 43/122 |
| 5,152,097 | A | * | 10/1992 | Rhodes | A01M 1/2005 43/131 |
| 5,243,781 | A | * | 9/1993 | Carter | A01M 1/02 426/1 |
| 5,392,560 | A | * | 2/1995 | Donahue | A01M 1/02 43/107 |
| 5,842,305 | A | * | 12/1998 | Liao | A01M 1/02 43/107 |
| 5,987,809 | A | * | 11/1999 | Cheok | A01M 1/02 43/107 |

(Continued)

*Primary Examiner* — David J Parsley
(74) *Attorney, Agent, or Firm* — Scherrer Patent & Trademark Law, P.C.; Stephen T. Scherrer; Monique A. Morneault

(57) ABSTRACT

The present invention relates to trap apparatuses for trapping insects therein. Specifically, the trap apparatuses comprise a conically-shaped passage leading to a holding reservoir for holding the insects therein. Flanges may be disposed at the bottom of the conically-shaped passage portion for securing the same over or otherwise in proximity to an insect nest. The insect trap apparatuses of the present invention are particularly useful for trapping yellow jackets and other like insects that create nests in the ground, in cracks in walls or other vertical structures, or other similar areas.

20 Claims, 2 Drawing Sheets

(56) References Cited

U.S. PATENT DOCUMENTS

| | | | | |
|---|---|---|---|---|
| 6,546,667 B1 * | 4/2003 | Carter | ............... | A01M 1/04 |
| | | | | 43/107 |
| 6,789,351 B2 * | 9/2004 | Chrestman | ............ | A01M 1/02 |
| | | | | 43/122 |
| 6,898,896 B1 * | 5/2005 | McBride | ............ | A01M 1/023 |
| | | | | 43/107 |
| 2011/0283599 A1 * | 11/2011 | Wu | ............ | A01M 1/02 |
| | | | | 43/113 |
| 2013/0067797 A1 * | 3/2013 | Aroniss | ............ | A01M 1/106 |
| | | | | 43/114 |

* cited by examiner

INSECT TRAP APPARATUSES AND METHODS OF USING THE SAME

This application claims the benefit of U.S. provisional application Ser. No. 61/693,033 filed on Aug. 24, 2012 and is incorporated by reference herein in its entirety.

TECHNICAL FIELD

The present invention relates to trap apparatuses for trapping insects therein. Specifically, the trap apparatuses comprise a conically-shaped passage leading to a holding reservoir for holding the insects therein. Flanges may be disposed at the bottom of the conically-shaped passage portion for securing the same over or otherwise in proximity to an insect nest. The insect trap apparatuses of the present invention are particularly useful for trapping yellow jackets and other like insects that create nests in the ground, in homes, or other similar areas through a crack, hole, or cavity.

BACKGROUND

It is generally known that human beings generally do not coexist well with insects, especially stinging insects like yellow jacket wasps and/or other like insects. Indeed, yellow jacket wasps, also known simply as "yellow jackets", typically make nests in ground burrows or other like cavities. In many cases, a yellow jacket queen, emerging in late winter or early spring, finds a suitable cavity or burrow, such as an abandoned rodent burrow, or the like, and starts building a paper nest therein, creating chambers for producing larva that eventually become drones and worker-daughters. Nests may quickly grow, and by late summer and early fall, typically can have up to 4000 to 5000 wasps.

At this time, in late summer and early autumn, yellow jacket preferences change from protein gathering to gathering sweet and sugary material. Thus, yellow jackets become nuisances to people as they attempt to enjoy the outdoors. Yellow jackets are frequently uninvited guests at picnics and other outdoor events having food and drinks. Caution must typically be taken, as yellow jackets can also become very aggressive, using its sting defense when provoked.

As noted, yellow jackets have a stinger for defense, which they can use repeatedly when provoked or when protecting their nest. Indeed, yellow jackets can pose a particular problem for individuals that may be allergic to stings, or even to those not allergic if the individual is stung a large number of times. In addition, disturbing a yellow jacket nest may cause the yellow jackets to swarm and sting repeatedly.

Therefore, it is quite clear that yellow jackets may be quite a nuisance in late summer and early autumn. To ameliorate the problems associated with these stinging insects, various traps have been proposed. Typically, a yellow jacket trap consists of a hanging reservoir having a chemical attractant therein for attracting a yellow jacket that may fly within a certain proximity of the trap. In some cases, the trap may contain water that may drown the yellow jacket as it becomes trapped therein. In other cases, the trap may contain a pesticide or poison that may kill the yellow jacket upon entering the trap. Moreover, some traps simply allow the yellow jackets to remain trapped and die on their own, as it may be very difficult for a yellow jacket to exit one of these known traps once it enters the same.

However, these traps must typically rely on attracting yellow jackets after they have left the nest, flying in proximity to the trap. There is no guarantee that a large number of yellow jackets, or any yellow jackets, will fly into a trap, as these may typically be placed a relatively large distance from a nest. Therefore, a need exists for insect trap apparatuses and methods of using the same that traps a large amount of yellow jackets.

Relatedly, existing traps are typically not placed in proximity to a yellow jacket nest. Therefore, trapping of any individual yellow jackets does not solve the source of the problem, and drones may quickly be produced to replace trapped yellow jackets. A need exists, therefore, for insect trap apparatuses and methods of using the same that eradicates the entirety, or nearly so, the population from a yellow jacket nest.

In addition, the use of chemical attractants and/or pesticides may pose environmental risks for humans and animals, as they may become exposed to the chemicals contained within a trap. Thus, a need exists for insect trap apparatuses that do not require the use of chemical attractants and/or pesticides that may pose a risk to humans and animals.

Moreover, existing traps typically are relatively small and can contain only a few hundred yellow jackets at any one time, limiting the effectiveness if the trap is highly attractive to yellow jackets within the area. As noted above, a typical nest in late summer or early autumn may contain between 4000 and 5000 yellow jackets. To trap that many yellow jackets, the trap must be emptied or changed repeatedly. In cases where chemical attractants and/or pesticides are used, these must be replenished as the trap becomes "reset" for more yellow jackets. Therefore, a need exists for insect trap apparatuses and methods of using the same that may be utilized to trap as many yellow jackets as may be contained within a nest without emptying the same.

SUMMARY OF THE INVENTION

The present invention relates to trap apparatuses for trapping insects therein. Specifically, the trap apparatuses comprise a conically-shaped passage leading to a holding reservoir for holding the insects therein. Flanges may be disposed at the bottom of the conically-shaped passage portion for securing the same over or otherwise in proximity to an insect nest. The conically-shaped passage may be situated either vertically over a next, or horizontally adjacent a nest that may be in an vertically disposed structure, for example. The insect trap apparatuses of the present invention are particularly useful for trapping yellow jackets and other like insects that create burrow-type nests in the ground, in structures, or other similar areas.

To this end, in an embodiment of the present invention, an insect trap apparatus is provided. The insect trap apparatus comprises a conically-shaped base section having a first open end on the wide end of the conically-shaped base section, and a second open end on the narrow end of the conically-shaped base section. The insect trap apparatus further comprising a trap reservoir disposed above the second open end of the base section, wherein the second open end juts within the space of the trap reservoir, forming a holding area for the wasps that is lower than the second open end of base section jutting into the space of the trap reservoir. The insect trap apparatus further comprises at least one extendable portion disposed in proximity to the first open end of the base section for holding the insect trap apparatus in place.

It is, therefore, an advantage and objective of the present invention to provide insect trap apparatuses and methods of using the same that traps a large amount of yellow jackets.

In addition, it is an advantage and objective of the present invention to provide insect trap apparatuses and methods of using the same that eradicates the entirety, or nearly so, the population from a yellow jacket nest.

Moreover, it is an advantage and objective of the present invention to provide insect trap apparatuses that do not require the use of chemical attractants and/or pesticides that may pose a risk to humans and animals.

Further, it is an advantage and objective of the present invention to provide insect trap apparatuses and methods of using the same that may be utilized to trap as many yellow jackets as may be contained within a nest without emptying the same.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to trap apparatuses for trapping insects therein. Specifically, the trap apparatuses comprise a conically-shaped passage leading to a holding reservoir for holding the insects therein. Flanges may be disposed at the bottom of the conically-shaped passage portion for securing the same over or otherwise in proximity to an insect nest. The insect trap apparatuses of the present invention are particularly useful for trapping yellow jackets and other like insects that create burrow-type nests in the ground or other similar areas.

Figure 1:
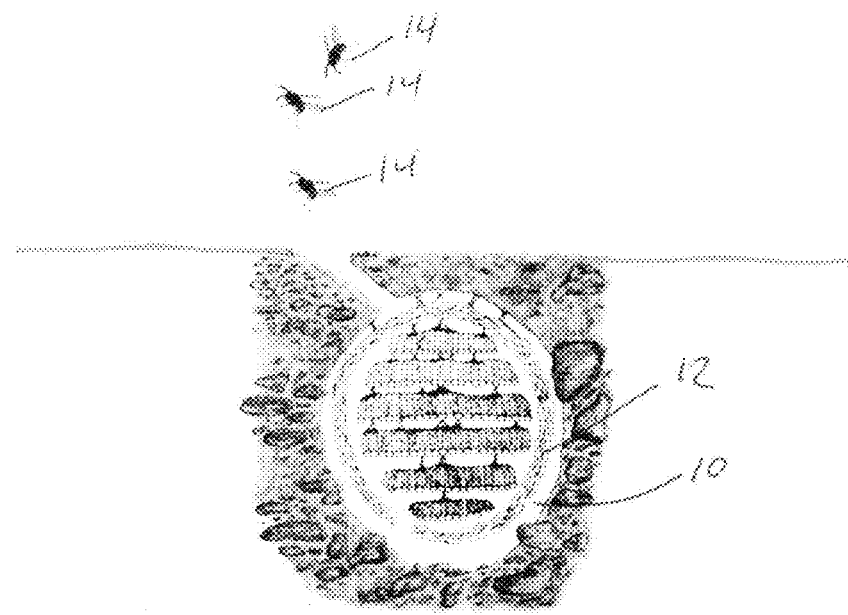
FIG. 1 illustrates a yellow jacket wasp nest in a burrow.

Now referring to the figures, wherein like numerals refer to like parts, FIG. 1 illustrates how yellow jacket wasps typically live within a burrow 10 in the ground. Within this burrow 10 may be a wasp nest 12 that may house hundreds, if not thousands of yellow jacket wasps. Typically, during daylight hours, yellow jacket wasp drones 14 leave the nest gathering food and materials for eating and/or building, returning to the nest to deliver the same to the colony. During spring and summer, typical yellow jacket wasps gather protein as a food source. However, during late summer and fall, yellow jacket wasps preferences change to sugars, making them a particular nuisance to human beings, especially if a large number of wasps are present. For defense, wasps have non-detachable stingers, meaning they can repeatedly sting an individual or pet, causing severe pain. Individuals having allergies must be particularly cautious during this time.

Figure 2:
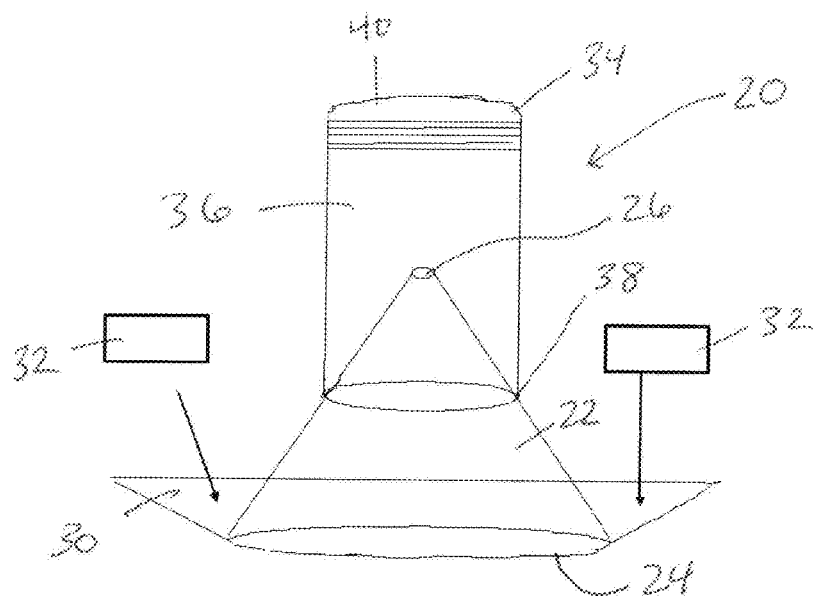
FIG. 2 illustrates a wasp trap apparatus in an embodiment of the present invention.

In an embodiment of the present invention, a wasp trap 20 is provided as illustrated in FIG. 2. The wasp trap may have a roughly conically-shaped base section 22 having a first open end 24 and a second open end 26. Although the base section 22 is generally described as "conically-shaped", it should be noted that the base section 22 may be pyramidally-shaped, or any other shape having a wider end and a narrow, tapered end, as described below.

The first open end 24 is generally at the wider portion of the conically-shaped base section 22, while the second open end 26 is the narrow upper portion of the conically-shaped base section 22. Within the base section 22, between the first open end 24 and the second open end 26 may be a flight passage area 28 for yellow jacket wasps.

Disposed at or near the first open end 24 of the base section 22 may be one or more flaps, flanges, or otherwise extending portions 30 extending away from the first open end 24 of the base section 22. The extending portion 30 may form an area for the placement of weights 32 thereon for holding the wasp trap 20 in position. The extending portion 30 may be flexible, such that the same may be placed against the ground, or otherwise fashioned in a manner to cover the entrance of a nest, and the weights may be placed thereon for holding the same in place.

Above the conically-shaped base section 22 may be a trap section 34 disposed above the base section 22, but placed in such a location that the second open end 26 of the base section 22 juts within an open trap space 36 within the trap section 34. The bottom end 38 of the trap section 34 may be connected to the base section 22 of the wasp trap 20, such as by stitches, adhesive, or any other means for holding the bottom end 38 of the trap section 34 to the base section 22 of the wasp trap 20. The bottom end 38 may form a holding area for wasps that enter the trap section 34 and die, falling to the bottom end 38 of the trap section 34. Because the second open end 26 of the base section 22 juts into the trap section 22, it is disposed above the bottom end 38, and wasps will not be able to reenter the second open end due to its narrowness. The trap section 34 may have a second closed end 40 disposed at a top thereof.

Figure 3:
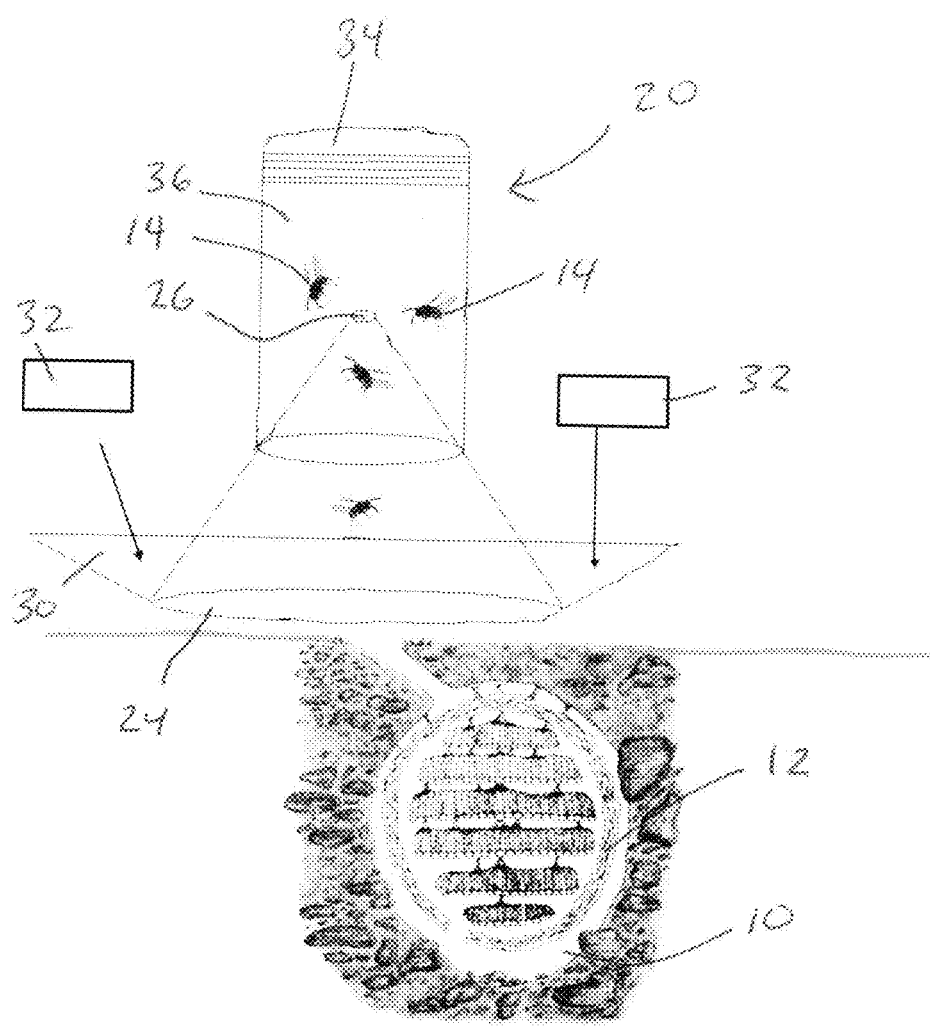
FIG. 3 illustrates a wasp trap apparatus in use over a yellow jacket wasp nest in an embodiment of the present invention.

In use, the wasp trap 20 may be placed over a hole in the ground leading to a burrow containing a wasp nest, as shown in FIG. 3. Preferably, the wasp trap 20 may be placed at night or at some other time so as to ensure that most or all of the wasps are contained within the nest, and at times of reduced activity to reduce the possibility of getting stung. Specifically, the trap may be placed roughly centered over the hole (in the ground, for example) leading to the wasp nest, and wasps may fly upwardly through the wasp passage area 28 upon leaving the wasp nest 12, such as during the daylight hours. The weights 32, placed upon the extending portion 30 may hold the wasp trap 20 to the ground, minimizing the chance that a wasp 14 flies out of the wasp trap 20.

As illustrated in FIG. 3, yellow jacket wasps 14 flying out of the nest fly into the wasp trap 20 by entering the first open end 24 and traversing the passage area 28. Because the base section 22 tapers towards the top thereof, the wasps fly or crawl through the tapered section and through the second open end 26 into the open trap space 36 within the trap section 34. Because the second open end 26 of the base section is a relatively small size, wasps do not fly or crawl through the second open end 26 in the opposite direction from the trap section 34 into the base section 22. The wasps 14 that fly into the trap section 34 become trapped within the trap section 34, whereupon they collect at the bottom end 38 thereof and eventually die.

The wasps 14 generally fly upwardly into the trap section 34 because their natural inclination upon leaving the nest is to fly up. Indeed, with the trap 20 placed over the wasps' entry hole, the wasp has no choice but to fly or otherwise move upwardly, thereby becoming trapped in the trap section 34. Thus, wasps become trapped therein without the use of chemicals, such as attractants or poisons that may be consumed by pets and/or children. However, it should be noted that the present invention should not be so limited, in that chemical attractants may be used within the trap section 34 for attracting wasps thereinto. Moreover, poisons may additionally, or alternatively, be provided for killing wasps that may be captured therein The wasp trap 20 may be made of any material apparent to one of ordinary skill in the art for accomplishing the functionality as described herein. In a preferred embodiment, the wasp trap 20 may be made from a flexible screen material that may be easy to manipulate during the manufacturing process and also easy to manipulate by a user when placing the same over a wasp nest. Moreover, the screen material may allow a user to see the wasps contained therein so that the user may know when the entirety of the wasp nest is captured by the wasp trap 20. Indeed, the wasp trap 20 may be placed over the wasp nest for several days to capture all or nearly all of the drones within the nest. As wasps become trapped, more wasps leave the nest to take the duties of the captured wasps, becoming captured themselves.

In an alternate embodiment, the base section 22 may be made from a generally rigid material, such as a polymeric material, such as plastic or rubber, or another material, to form a sturdy base that is easy to set up and relatively difficult to move once placed. The trap section 34 may be made from the aforementioned screen material, or any other material, whether flexible or rigid, transparent, translucent, or opaque. Moreover, if opaque, transparent or translucent windows may be provided for seeing thereinto.

In addition, instead of weights holding down the extendable section 30 from the base section 22, stakes may be used for holding the extendable section in the ground at that location. Moreover, if the wasp trap 22 is heavy enough, weights, stakes or any other means for holding the wasp trap 20 in the particular location may be unnecessary. Moreover, the base section 22 may sit upon legs, whereupon the base section may sit a few inches off of the ground. However, even with this space between the ground and the base section 22, the wasps still tend to fly directly upwardly into the trap section 34. The use of the present apparatus may be utilized over any hole or crack where insects fly therethrough to obtain access to a nest, such as in vertically-disposed structures. Specifically, the apparatus of the present invention may be situated horizontally over a hole or crack in a vertical structure, such as a wall in a building, a fence, or the like.

As is known by one of ordinary skill in the art, wasp nests may not be contained within the ground such that a wasp trap 20 of the present invention may not be placed directly over the same. For example, yellow jacket wasp nests may frequently be within holes in building walls, siding, or other more vertical structures. The wasp trap 20 of the present invention may still be utilized in such a situation by disposing the wasp trap 20 directly above the hole in the vertical structure, such as by hanging the same from a wire or line, or resting the same on a platform directly over the hole in the vertical structure. Because yellow jacket wasps tend to fly directly upwardly, placement of the wasp trap above the hole in the vertical structure still traps the wasps, because upon leaving the hole in the vertical structure, they typically fly upwardly and into the trap section 34.

In an alternate embodiment, the trap 20 may be placed directly over the hole in the vertical structure, and extend horizontally away from the vertical structure, being held by supports, such as wires or lines that may extend from the vertical structure, or support from beneath the same. Upon leaving the nest, the wasps may be forced to fly horizontally until they traverse through the second open end 26 and into the trap section 34. In a further alternate embodiment, the base section 22 of the wasp trap 20 may be bent or otherwise shaped to extend upwardly in an "L" formation. Thus, even if the first open end 24 of the base section 22 is placed directly over the hole of the vertical structure and initially extends horizontally away from the same, the yellow jacket wasps may fly out of the hole in the vertical structure, and then fly upwardly as they would naturally do into the trap section 34.

When the user is secure that the vast majority of the wasps have been captured within the trap section 34 of the wasp trap 20, the user may simply remove the wasp trap 20 and dispose of the same in the garbage or via some other disposal means. Alternatively, the trap section 34 may be detachable from the base section 22 such that the trap section may be disposed of, and replaced on the base section 22 with a fresh trap. Thus, the base section 22 may be reusable. Additionally, the trap section 34 may have an openable top end, or other opening, for removal of the quantity of wasps therein, whereupon the entirety of the wasp trap 20 may be reused, if desired.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. An insect trap apparatus for trapping insects, the insect trap apparatus comprising:
    a first terminal end and a second terminal end opposite the first terminal end;
    a base section proximal the first terminal end, the base section having a wide end, a narrow end, an interior space and an outer surface between the wide end and the narrow end surrounding the interior space, and a longitudinal length between the wide end and the narrow end, the narrow end having a cross-section smaller than the wide end;
    a first opening on the wide end of the base section;
    a second opening on the narrow end of the base section;
    a chamber disposed over the narrow end of the base section, wherein the chamber terminates on the outer surface between the wide end and the narrow end of the base section, and further wherein the second opening opens within an interior space of the chamber forming a holding area for insects; and
    a flexible flap disposed completely around the first opening of the base section and extending laterally from the wide end of the base section and further wherein the flap extends from the wide end of the base section at the first terminal end of the insect trap apparatus and further has no supporting leg structure disposed beneath the flap and further wherein the base section has no openings in the outer surface above the flap and below the chamber and further wherein the first opening is disposed at the first terminal end of the insect trap apparatus and further has no structure disposed beneath the first opening.

2. The insect trap apparatus of claim 1 wherein the base section is conically-shaped.

3. The insect trap apparatus of claim 1 wherein the base section is pyramidally-shaped.

4. The insect trap apparatus of claim 1 wherein the apparatus is translucent.

5. The insect trap apparatus of claim 1 wherein the apparatus is made from a mesh material.

6. The insect trap apparatus of claim 1 wherein the apparatus is made from a rigid material.

7. The insect trap apparatus of claim 6 wherein the chamber further comprises at least one viewing window.

8. The insect trap apparatus of claim 1 further comprising at least one weight for holding the insect trap apparatus in place.

9. The insect trap apparatus of claim 1 wherein the insect trap apparatus is disposed in a vertical configuration over an insect nest.

10. The insect trap apparatus of claim 1 wherein the insect trap apparatus is disposed in a horizontal configuration over the insect nest.

11. A method for trapping insects, the method comprising the steps of:
providing an insect trap apparatus comprising a first terminal end and a second terminal end opposite the first terminal end, a base section proximal the first terminal end having a wide open end, a narrow open end, an interior space, and an outer surface between the wide open end and the narrow open end surrounding the interior space, and a length between the wide open end and the narrow open end, the narrow open end having a cross-section smaller than the wide open end, a chamber disposed over the narrow open end of the base section, wherein the chamber terminates on the outer surface between the wide open end and the narrow open end of the base section, and further wherein the narrow open end opens within an interior space of the chamber forming a holding area for insects, a flexible flap disposed completely around the first opening of the base section and extending laterally from the base section at the first terminal end of the insect trap apparatus and further wherein the flap has no supporting leg structure disposed beneath the flap and further wherein the base section has no openings in the outer surface above the flap and below the chamber and further wherein the first opening is disposed at the first terminal end of the insect trap apparatus and further has no structure disposed beneath the first opening;
providing an insect nest under the ground surface and a passage leading from the insect nest to the ground surface; and
placing the insect trap apparatus over the insect nest so that the wide open end of the base section is disposed against the ground surface and over the passage and wherein the flexible flap is disposed on the ground surface and contacts the ground surface completely around the wide open end of the base section conforming to the shape of the ground and preventing an insect from moving beneath the flap.

12. The method of claim 11 further comprising the steps of:
providing at least one weight;
placing the at least one weight on the flap; and
holding the insect trap apparatus in place with the at least on weight.

13. The method of claim 11 further comprising the step of:
leaving the insect trap apparatus over the nest over a period of time.

14. A system for trapping insects comprising:
a ground surface having an insect nest thereunder and an opening to a passage that runs from the surface to the insect nest; and
an insect trap apparatus comprising a base section having a wide open end, a narrow open end, an interior space, and an outer surface between the wide open end and the narrow open end surrounding the interior space, and a length between the wide open end and the narrow open end, the narrow open end having a cross-section smaller than the wide open end, a chamber disposed over the narrow open end of the base section, wherein the chamber terminates on the outer surface between the wide open end and the narrow open end of the base section, and further wherein the narrow open end opens within an interior space of the chamber forming a holding area for insects, a flexible flap disposed completely around the wide open end of the base section and extending laterally from the wide open end of the base section and configured to conform to the ground surface and hold the insect trap apparatus in place against the ground surface having an insect nest thereunder, and further wherein the base section has no openings in the outer surface above the flap and below the chamber,
wherein the wide open end of the base section is disposed against the ground surface and over the opening that runs from the ground surface to the insect nest and wherein the flexible flap is disposed on the ground surface and contacts the ground surface completely around wide open end of the base section conforming to the ground surface and preventing passage of insects between the flap and the ground surface.

15. The system of claim 14 wherein the base section is conically-shaped.

16. The system of claim 14 wherein the base section is pyramidally-shaped.

17. The system of claim 14 wherein the apparatus is translucent.

18. The system of claim 14 wherein the apparatus is made from a rigid material.

19. The system of claim 14 wherein the chamber further comprises at least one viewing window.

20. The system of claim 14 further comprising at least one weight for holding the insect trap apparatus in place.

* * * * *